ACOUSTICAL DISPERSIVE DELAY LINE HAVING STRATIFIED WAVEGUIDE OF AT LEAST TWO SOLID MEDIA COUPLING INPUT AND OUTPUT TRANSDUCERS

Filed March 14, 1967 3 Sheets-Sheet 1

ACOUSTICAL DISPERSIVE DELAY LINE HAVING STRATIFIED WAVEGUIDE OF AT LEAST TWO SOLID MEDIA COUPLING INPUT AND OUTPUT TRANSDUCERS

Filed March 14, 1967 3 Sheets-Sheet 3

United States Patent Office

3,464,033
Patented Aug. 26, 1969

3,464,033

ACOUSTICAL DISPERSIVE DELAY LINE HAVING STRATIFIED WAVEGUIDE OF AT LEAST TWO SOLID MEDIA COUPLING INPUT AND OUTPUT TRANSDUCERS

Pierre Tournois, Paris, France, assignor to CSF-Compagnie Generale de Telegraphie Sans Fil, a corporation of France Filed Mar. 14, 1967, Ser. No. 623,071
Claims priority, application France, Mar. 17, 1966, 53,860
Int. Cl. H03h 7/30
U.S. Cl. 333—30 8 Claims

ABSTRACT OF THE DISCLOSURE

Dispersive acoustic line comprising first and second electromechanical transducers coupled to each other by means of a stratified waveguide made of at least two laminated solid media. Rayleigh waves are generated along the waveguide in response to a frequency modulated electric pulse fed to the first transducer and they are collected by the second transducer which supplies a compressed pulse whose duration is inversely proportional to the frequency excursion.

The present invention relates to passive devices enabling the compression of a frequency modulated electric signal so as to increase its amplitude and reduce its duration. Such devices are formed by electric networks with lumped elements, or by propagation lines comprising a dispersive waveguide. Between the input and the output of these compression devices, the constituents of the signal undergo a delay which varies with the frequency which results in their being regrouped in time.

Amongst known compression systems, one may mention the electromagnetic systems which have the drawback of being bulky, owing to the great wavelength of the used waves; there are also electric networks whose constructions are difficult. Furthermore, there are acoustic systems, such as ultrasonic delay lines which are generally non-dispersive, the obtained delay being independent of the frequency.

In order to take full advantage of pulse compression, systems which are highly dispersive within a broad band of frequencies are needed. It is desirable that such systems should not be bulky while being of simple design and structure.

According to the invention there is provided a dispersive acoustic line for compressing frequency modulated electrical signals, said line having a longitudinal axis and comprising: a solid stratified medium comprising a base and a layer covering said base and in intimate contact therewith, said base propagating mechanical vibrations with a velocity higher than said layer, said layer being thinner than said base and having two ends; first electromechanical transducer means coupled to one of said ends to excite in said line mechanical vibrations in planes normal to said layer and parallel to said axis, and further transducer means coupled to the other end for collecting said vibrations.

For a better understanding of the invention and to show how the same may be carried into effect reference will be made to the drawings accompanying the following description and in which:

FIG. 3(*b*) is an explanatory diagram;

Figures 1, 2:
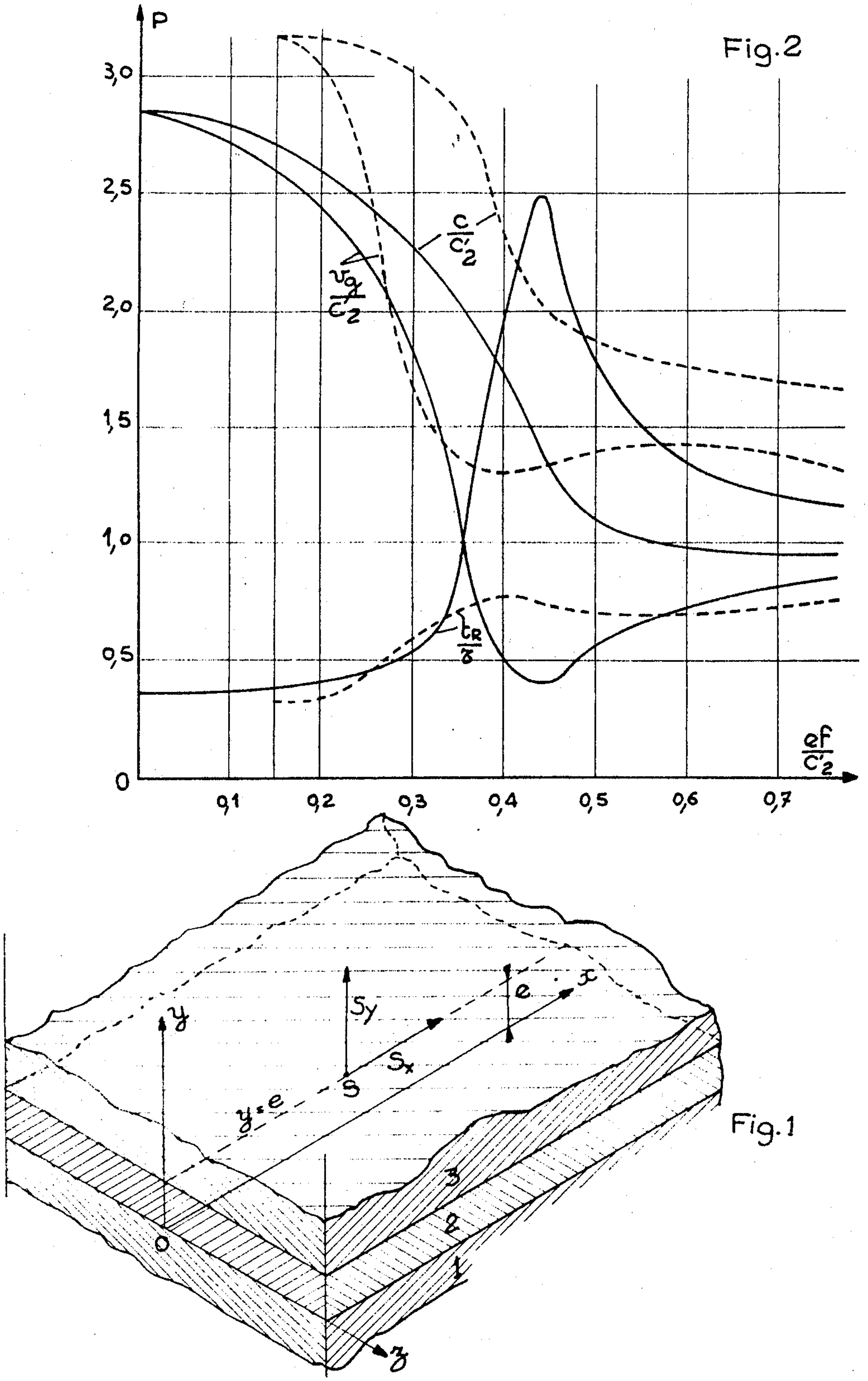
FIG. 1 shows a stratified medium of the type which may be used according to the invention.
FIG. 2 is an explanatory diagram.

In FIG. 1 there is shown with respect to a system of axes *oxyz*, a portion of a stratified medium, comprising a thin layer 2 with a thickness *e*, the surface $y=o$ and $y=e$ being parallel to the plane *xoz*. This layer 2 is sandwiched between media forming, respectively, a solid base 1 and a reflector 3. The media 1 and 3 adhere perfectly to the layer 2 and may extend infinitely in all directions in space. According to the invention, the reflector 3 is either infinitely rigid or infinitely deformable relative to the other two components of the stratified medium which differ in that the medium 1 propagates mechanical vibrations at higher velocities than the medium 2; $\rho_1$ and $\rho_2$ are the specific masses, $\mu_1$ and $\mu_2$ the rigidities, $C_1$ and $C_2$ the propagation velocities of the longitudinal or compression waves, and $C'_1$ and $C'_2$ the propagation velocities of the transverse or shear waves relative to the base 1 and the layer 2.

With respect to the direction of propagation of a wave in a solid medium having a plane of incidence, three types of waves can be propagated; the waves P or longitudinal or compression waves have their vibrational displacements parallel to the direction of propagation of the wave; the SH and SV waves, or transverse or shear waves have vibrational displacements perpendicular to the direction of propagation and, respectively, perpendicular to the plane of incidence or in the plane of incidence. The P and SV waves form, by superposition, the so-called Rayleigh waves the displacements of which are in the planes normal to the layer 2 and parallel to *ox*.

For putting the invention into practice certain curves have first to be drawn. There curves are shown in FIG. 2. They are obtained by calculation which are very complicated and require the use of computers and only the general frame work of which will be outlined here.

FIG. 1 shows the displacements at a point S. These displacements have two components $S_x$ and $S_y$ which, as is known will both derive from a scalar potential function $\Phi$ and a potential vectorial function $\vec{\Psi}$ having a component $\Psi$ along *oz*. These functions are as follows:

$$\Phi_1=A_1\cdot e^{\alpha_1 y}\cdot e^{j(\omega t-kx)}$$
$$\Psi_1=B_1\cdot e^{\alpha'_1 y}\cdot e^{j(\omega t-kx)}$$
$$\Phi_2=[A_2e^{j\alpha_2 y}+A'_2e^{-j\alpha_2 y}]e^{j(\omega t-kx)}$$
$$\Psi_2=[B_2e^{ja'_2 y}+B'_2e^{-ja'_2 y}]e^{j(\omega t-kx)}$$

The subscript 1 relates to the base 1, the subscript 2 to the layer 2; $\omega$ is the angular frequency and the $k$ is the wave number of the Rayleigh wave excited in the stratified medium; $A_1$, $B_1$, $A_2$, $A'_2$, $B_2$ and $B'_2$ are integration constants and $\alpha_1$, $\alpha_2$, $\alpha'_1$, $\alpha'_2$ are given by the following identities:

$$\alpha_1^2=k^2-(\omega/C_1)^2$$
$$\alpha'^2_1=k^2-(\omega/C'_1)^2$$
$$\alpha_2^2=(\omega/C_2)^2-k^2$$
$$\alpha'^2_2=(\omega/C'_2)^2-k^2$$

The theory of elasticity gives as a function of potentials $\Phi$ and $\Psi$ the displacements and stresses inside the stratified medium:

The normal displacement:

$$S_y=\frac{\delta\Phi}{\delta y}-\frac{\delta\Phi}{\delta x}$$

The tangential displacement:

$$S_x=\frac{\delta\Phi}{\delta x}+\frac{\delta\Phi}{\delta y}$$

The normal stress:

$$P_y=\lambda\cdot\Delta\Phi+2\mu\frac{\delta S_y}{\delta y}$$

The tangential stress:

$$P_x=\mu\left(\frac{\delta S_y}{\delta x}+\frac{\delta S_x}{\Delta y}\right)$$

where $\lambda$ and $\mu$ are the Lamé coefficients of the body under review.

A prerequisite to the existence of Rayleigh waves in the stratified medium of FIG. 1 is that certain relations should be satisfied on the surfaces $y=o$ and $y=e$ in the layer 2, and which express the continuity of the displacements and stresses.

These boundary conditions comprise four conditions with regard to the surface $y=o$ and two conditions with regard to the surface $y=e$; however, these last two conditions can differ according to whether the surface $y=e$ is free or strictly rigid; finally, one obtains a system of six equations with six unknowns $A_1$, $A_2$, $B_1$, $B_2$, $A_1'$, $B_2'$ which may be expressed symbolically as follows:

$$\begin{cases} a\cdot A_1+b\cdot B_1+c\cdot A_2+d\cdot A_2'+f\cdot B_2+g\cdot B_2'=0 \\ h\cdot A_1+i\cdot B_1+j\cdot A_2+k\cdot A_2'+l\cdot B_2+m\cdot B_2'=0 \\ \cdot \quad \cdot \quad \cdot \quad \cdot \quad \cdot \quad \cdot \quad =0 \\ \cdot \quad \cdot \quad \cdot \quad \cdot \quad \cdot \quad \cdot \quad =0 \\ \cdot \quad \cdot \quad \cdot \quad \cdot \quad \cdot \quad \cdot \quad =0 \end{cases}$$

$a$, $b$, $c$, $d$, . . . are functions of $\alpha_1$, $\alpha_2$, $\alpha'_1$, $\alpha'_2$, $\omega$, $k$, $\mu_1$, $\mu_2$, $\lambda_1$, $\lambda_2$ and $e$.

The determinant $\Delta$ of this system must be zero, since there must be a free choice of one of the six unknowns, in view of the fact that the complex amplitude of the Rayleigh depends on the sources which excites the stratified medium. By equalling $\Delta$ to zero, one obtains a dispersion equation which can be written as follows:

$$k=f\left(\frac{C_1}{C_1'},\frac{C_2}{C_2'},\frac{C_1'}{C_2'},\frac{\rho_1}{\rho_2},\frac{\mu_1}{\mu_2},e,\omega\right)$$

By means of a very long and complex calculation, which it would be useless to develop here, one can express graphically the law governing the variation in the phase velocity C of the Rayleigh waves in the stratified medium of FIG. 1.

FIG. 2 shows a normalized diagram, showing along the abscissa the parameter $$\frac{e\cdot f}{C_2'}$$

where $f$ is the frequency of the Rayleigh wave and along the ordinate a variable P, representing the ratios $C/C_2'$ $V_g/C_2'$ and $t_r/\tau$ which characterize the dispersive properties of the stratified medium of FIG. 1. In drawing these curves, it has been assumed by way of example that the upper surface of the layer 2 is free and the media 1 and 2 are such that:

$$\frac{C_1}{C_1'}=\frac{C_2}{C_2'}=3$$

$$\frac{C_1'}{C_2'}=3.147$$

$$\frac{\rho_1}{\rho_2}=1.39$$

$$\frac{\mu_1}{\mu_2}=13.766$$

The curves in full line relate to the first antisymmetrical propagation mode $M_{11}$ which can be propagated in the stratified medium, whilst the curves in dotted line relation to the first symmetrical mode $M_{21}$.

The curves $C/C_2'$ show that the phase velocity C of the Rayleigh waves changes with the frequency $f$. Hence, it is a dispersive medium. The curves $V_g/C_2'$ are derived from the former and represent the variations of the group velocity $V_g$ as a function of the frequency $f$.

The curves $t_r/\tau$ are the reverse of the curves $V_g/C_2'$. They give, as a function of the frequency, the value of the delay time $t_r$ of the Rayleigh waves, taking as unity the delay time $\tau$ of a transverse wave progagating through the layer 2 with the phase velocity $C_2'$.

The curve $t_r/\tau$ in full line shows that the dispersion characteristic of the first antisymmetrical mode of the Rayleigh waves is perfectly suitable for compressing a linearly frequency modulated signal since, between the values of 0.34 and 0.43 of the coefficient $e_f/C_2'$, one obtains a linear increase of $t_r/\tau$ from 0.7 to 2.4. The curve $t_r/\tau$ in dotted lines is less favourable from this point of view.

Figure 3A:
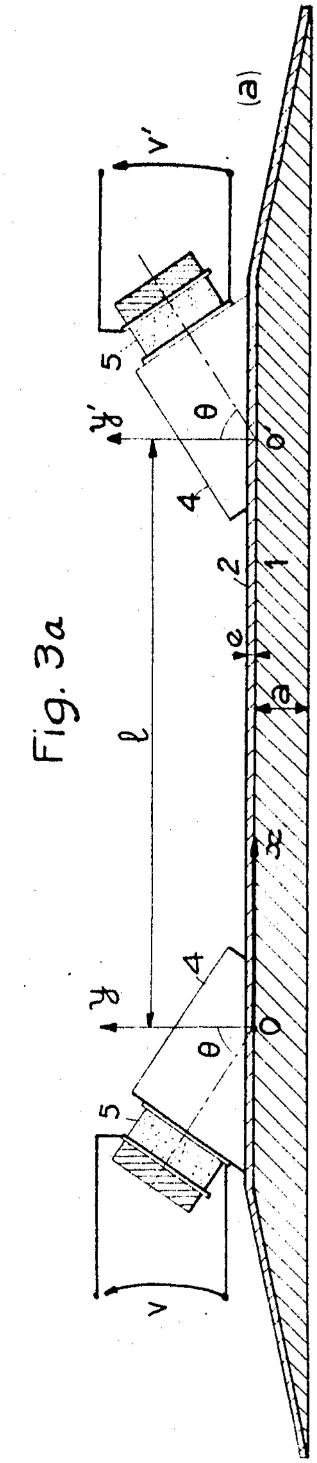
FIG. 3(*a*) shows a first embodiment of a dispersive line according to the invention.
Figure 3B:
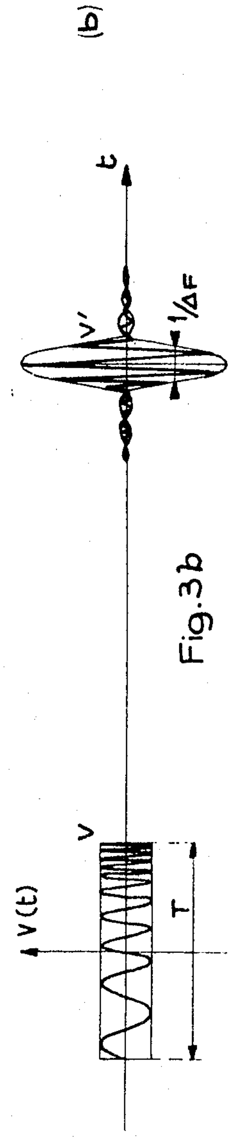

FIG. 3 shows at (*a*) a first example of a dispersive line according to the invention. It comprises a base 1, having a thickness $a$, on the upper surface of which there is deposited with molecular adherence a thin layer 2 having a thickness $e$. The layer 3 in the present instance is air. The outer upper surface of the layer 2 is thus free and supports at its ends 0 and 0', spaced from each other by a distance $l$, two devices formed by a coupling prism 4 associated with an electroacoustic transducer 5. The system 4–5 on the left excites in the line 1–2 Rayleigh waves, the displacements of which are contained in the plane of the drawing. The device 4–5 on the right receives the waves after they have travelled through the distance $l$. Beyond each transducer, the line 1–2 is tapered to prevent reflection of the Rayleigh waves from the ends of the line. FIG. 3*b* shows diagrammatically, as a function of the time, the frequency modulated signals V and V' appearing successively at the terminals of the left-hand and right-hand.

Since the frequency modulation interval $\Delta F$ for the signal V has the duration T, the desired compression is obtained by using a variation $\Delta t_r$ of the delay time, equal to T, the length $l$ of the line is given by the relation:

$$l=T\cdot C_2'\cdot\left(\frac{\Delta t_r}{\tau}\right)^{-1}$$

where $\Delta t_r/\tau$ is the variation of P which corresponds in FIG. 2 to the range of variation $$\frac{e\cdot\Delta F}{C_2'}$$

In this case it can be shown that the linearly frequency modulated pulses V will be compressed at the ratio $D=T\cdot\Delta F$, since the compressed pulse V' has the width $1/\Delta F$.

Figure 4:
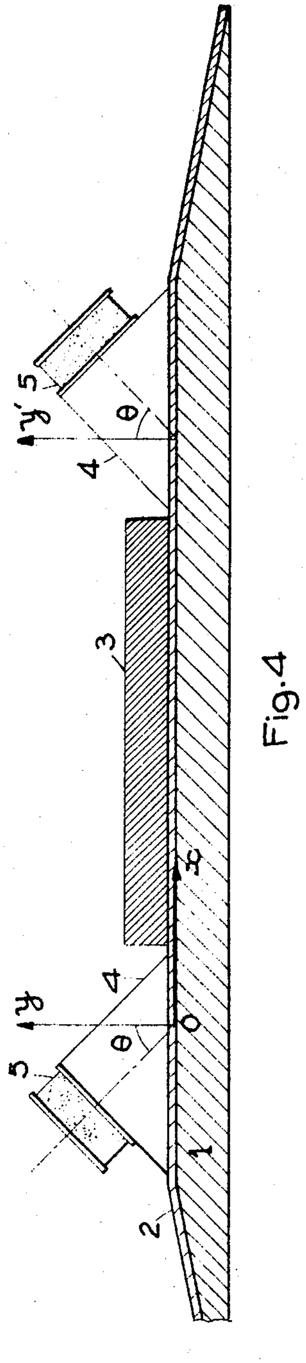
FIG. 4 shows a further embodiment of a dispersive line according to the invention.

FIG. 4 shows a second example of a dispersive line according to the invention. It differs from the construction of FIG. 3 by the addition of a reflector 3 which opposes any vibrational displacement of the upper surface of the layer 2.

Figure 5:
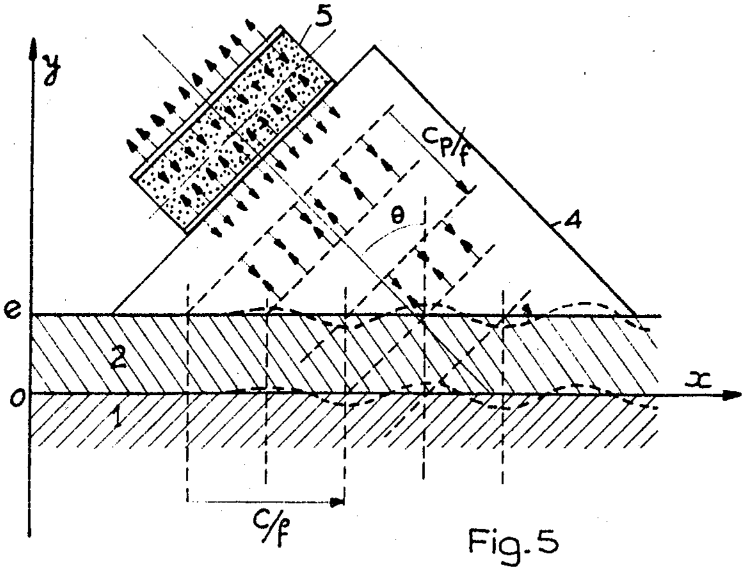
FIGS. 5 and 6 are explanatory drawings.
Figure 6:
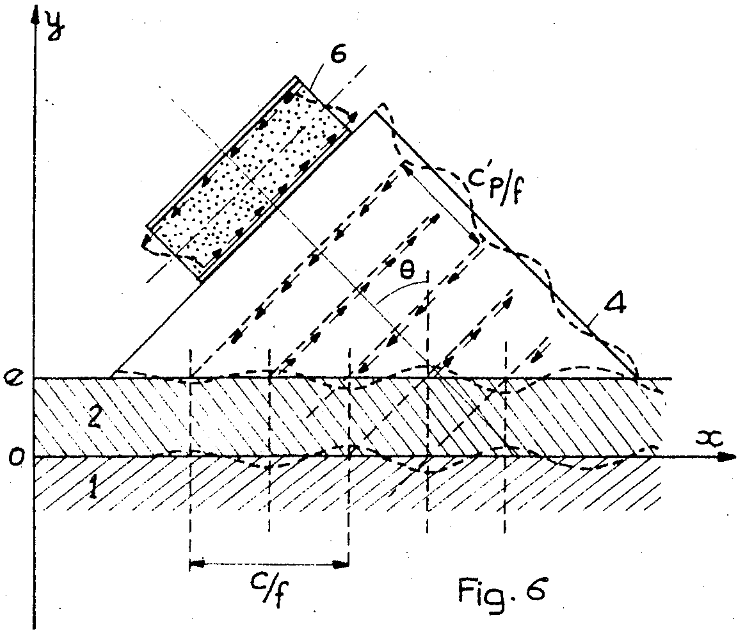

The excitation of Rayleigh waves in the structures of FIGS. 3 and 4 can be effected by the devices shown in FIGS. 5 and 6.

FIG. 5 shows an electroacoustic transducer 5, coupled by means of a prism 4 to the layer 2 of the stratified medium 1–2. The transducer 5 generates in the prism 4 a longitudinal dilatation wave with an incidence $\theta$ relative to the surface $y=e$ of the layer 2. This wave excites in the layer 2 a Rayleigh wave whose vibrational displacements parallel to the plane of the drawing are shown schematically in dotted lines; the deformations of the layer 2 are shown under the assumption of an antisymmetrical mode such as $M_{11}\cdot C_p$ is the velocity of the longitudinal waves in the prism 4, and then the angle of incidence $\theta$ is given by the relation:

$$\sin \theta = \frac{C_p}{C}$$

where C is the phase velocity of the Rayleigh waves travelling along $ox$.

FIG. 6 shows an electroacoustic transducer 6 connected through a prism 4 to the layer 2 of the stratified medium 1–2. The transducer 6 generates in the prism 4 a transverse shear wave, having an incidence $\theta'$ relative to the face $y=e$ of the layer 2. This wave excites in the layer 2 a Rayleigh wave whose vibrational displacements parallel to the plane of the drawing are shown in dotted lines; the deformations of the layer 2 are shown under the assumption of a symmetrical mode, such as $M_{21}$, and the drawings also show in dotted lines the deformations of the transducer 6 and of the free surface of the prism 4. Since $C_p'$ is the phase velocity of the transverse waves in the prism 4, the angle of incidence $\theta$ is given by the relation:

$$\sin \theta' = \frac{C_p'}{C}$$

Structures according to FIGS. 3 and 4 can be associated with either of the modes of excitations according to FIGS. 5 and 6. The mode propagated in the form of Rayleigh waves is generally a mode $M_{m,n}$ whose dispersion characteristics permit the compression of a frequency modulated signal according to a suitable law. Naturally, a line according to the invention can be used in either direction, that is to say, either for producing a compression or for producing an expansion of frequency modulated signals.

A dispersive line according to the embodiment of FIG. 3 has been constructed with the following characteristics: The waveguide comprises a steel base, on which a copper layer, 24 microns thick, is deposited. Using the first antisymmetrical propagation mode for propagating a frequency modulated pulse, having a 30 mc. carrier frequency and a 10 mc. frequency excursion, one obtains a compressed pulse having a 0.1 $\mu$sec. width; for compressing a pulse having a duration of 10 $\mu$sec. the dispersive line should be 108 mm. long.

Of course the invention is not limited to the embodiments described and shown which were given solely by way of example.

What is claimed is:

1. A dispersive acoustic line for compressing frequency modulated electrical signals, said line having a longitudinal axis and comprising: a solid stratified medium comprising a base and a layer covering said base and in intimate contact therewith, said base propagating mechanical vibrations with a velocity higher than said layer, said layer being thinner than said base and having two ends; first electromechanical transducer means coupled to one of said ends to excite in said line mechanical vibrations in planes normal to said layer and parallel to said axis; and further transducer means coupled to the other end for collecting said vibrations.

2. A line as claimed in claim 1, wherein said layer is an imposed layer.

3. A line as claimed in claim 1, wherein reflector means are associated with the outer face of said layer.

4. A line as claimed in claim 1, comprising coupling means for respectively coupling said transducer means to said layer, said coupling means including a solid prism having one face in contact with said transducer and one face in contact with said layer, said faces forming an angle, the sine of which is equal to the ratio of the propagation velocity in said prism to the propagation velocity of the Rayleigh waves in said line.

5. A line as claimed in claim 4, wherein said first transducer excites in said prism a longitudinal compression wave having vibratory displacements parallel to said planes.

6. A line as claimed in claim 4, wherein said transducer excites in said prism a shear wave, having vibratory displacements parallel to said planes.

7. A line as claimed in claim 1, wherein said base has a constant section between said transducers and has absorbing means at its ends.

8. A line as claimed in claim 7, wherein said base has tapered ends.

References Cited

UNITED STATES PATENTS 3,350,665 10/1967 Fair ---------------- 333—30

FOREIGN PATENTS 893,059 10/1953 Germany.

HERMAN KARL SAALBACH, Primary Examiner

T. VEZEAU, Assistant Examiner

U.S. Cl. X.R.

333—72